(12) United States Patent
Yoshida

(10) Patent No.: US 9,230,743 B2
(45) Date of Patent: Jan. 5, 2016

(54) GRAVURE PRINTING PLATE AND MANUFACTURING METHOD THEREOF, GRAVURE PRINTING MACHINE, AND MANUFACTURING METHOD FOR LAMINATED CERAMIC ELECTRONIC COMPONENT

(71) Applicant: MURATA MANUFACTURING CO., LTD., Kyoto-fu (JP)

(72) Inventor: Kazuhiro Yoshida, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 14/495,588

(22) Filed: Sep. 24, 2014

(65) Prior Publication Data

US 2015/0107472 A1 Apr. 23, 2015

(30) Foreign Application Priority Data

Oct. 22, 2013 (JP) ................................. 2013-219098

(51) Int. Cl.
*B41N 1/00* (2006.01)
*H01G 4/30* (2006.01)
*H01G 4/12* (2006.01)
(Continued)

(52) U.S. Cl.
CPC ........ *H01G 4/308* (2013.01); *B41C 1/00* (2013.01); *B41N 1/06* (2013.01); *B41N 1/20* (2013.01); *H01G 4/012* (2013.01); *H01G 4/12* (2013.01); *B41C 1/188* (2013.01)

(58) Field of Classification Search
CPC ..................................... B41C 1/00; B41N 1/16

USPC ........................................................ 101/395
See application file for complete search history.

(56) References Cited

U.S. PATENT DOCUMENTS 2,431,710 A 12/1947 Schultz et al.
4,387,154 A * 6/1983 Whitmore .............. G03C 1/765
428/116

(Continued)

FOREIGN PATENT DOCUMENTS

JP 06-316174 A 11/1994
JP H11-42764 A 2/1999

(Continued)

OTHER PUBLICATIONS

An Office Action; "Notification of Preliminary Rejection," issued by the Korean Patent Office on Sep. 18, 2015, which corresponds to Korean Patent Application No. 10-2014-0125124 and is related to U.S. Appl. No. 14/495,588; with English language translation.

*Primary Examiner* — Anthony Nguyen
(74) *Attorney, Agent, or Firm* — Studebaker & Brackett PC

(57) ABSTRACT

Banks, as well as a plurality of substantially recess-shaped cells defined by the banks, are provided in an image section formed in a gravure printing plate. Each of edge cells located along an outer edge of the image section is provided with a projecting portion that projects from a part of a base surface of that edge cell, and each projecting portion is distanced from the banks and located closer to the outer edge than the center of the corresponding edge cell. Preferably, the projecting portions and the banks that face the outer edge are positioned at a predetermined interval from the outer edge, and substantially frame-shaped recess portions that extend continuously along the outer edge are provided in the image section.

15 Claims, 18 Drawing Sheets

(51) Int. Cl.
*H01G 4/012* (2006.01)
*B41C 1/00* (2006.01)
*B41N 1/06* (2006.01)
*B41N 1/20* (2006.01)
*B41C 1/18* (2006.01)

(56) References Cited

U.S. PATENT DOCUMENTS

| | | | |
|---|---|---|---|
| 7,063,014 B2 * | 6/2006 | Hashimoto | H01G 4/308 101/150 |
| 7,481,162 B2 * | 1/2009 | Takashima | B41F 9/00 101/150 |
| 2003/0111158 A1 * | 6/2003 | Okuyama | B32B 18/00 156/89.12 |
| 2012/0125211 A1 * | 5/2012 | Baumann | B41M 1/10 101/170 |
| 2013/0168138 A1 * | 7/2013 | Yamazaki | H05K 1/0296 174/253 |

FOREIGN PATENT DOCUMENTS

| | | | |
|---|---|---|---|
| JP | 2003-209025 A | 7/2003 | |
| JP | 2006-051721 A | 2/2006 | |
| JP | 2012-056143 A | 3/2012 | |
| WO | WO 2012114279 A1 * | 5/2012 | B41M 1/10 |

* cited by examiner

GRAVURE PRINTING PLATE AND MANUFACTURING METHOD THEREOF, GRAVURE PRINTING MACHINE, AND MANUFACTURING METHOD FOR LAMINATED CERAMIC ELECTRONIC COMPONENT

CROSS REFERENCE TO RELATED APPLICATIONS

This application claims benefit of priority to Japanese Patent Application No. 2013-219098 filed Oct. 22, 2013, the entire content of which is incorporated herein by reference.

TECHNICAL FIELD

The present disclosure relates to gravure printing plates and manufacturing methods thereof, gravure printing machines, and manufacturing methods for laminated ceramic electronic components carried out using gravure printing machines, and particularly relates to techniques for increasing the contour precision of a paste film formed through gravure printing.

BACKGROUND

To manufacture laminated ceramic electronic components such as laminated ceramic capacitors, a process is carried out for forming a conductive paste film, which will serve as an internal electrode, onto a ceramic green sheet, for example. There is demand for the internal electrode obtained from this conductive paste film to have a high pattern accuracy and a uniform thickness. Gravure printing has garnered attention as a technique capable of meeting such demand.

Gravure printing is a printing method carried out using a gravure cylinder as a gravure printing plate, where a plurality of image sections, each configured as a collection of small recess-shaped cells, are formed in an outer circumferential surface of the gravure cylinder, and ink with which each cell is filled is transferred onto a printing target material.

An etching technique such as chemical etching, for example, is employed to form the image sections. The gravure cylinder can be manufactured efficiently, with a high machining accuracy, by employing an etching technique in this manner.

However, the following problems can arise when carrying out a process for forming a conductive paste film to serve as an internal electrode on a ceramic green sheet through gravure printing. Namely, because the image section formed in a gravure printing plate such as a gravure cylinder is configured of a collection of a plurality of cells, a contour in the conductive paste film transferred onto the ceramic green sheet, which serves as a printing target material, may not have the desired shape.

This will be described in further detail with reference to FIGS. 16A and 16B. FIG. 16A is an expanded view of part of the outer circumferential surface of a substantially drum-shaped gravure cylinder 1 that serves as a gravure printing plate, and illustrates the vicinity of an outer edge 3 of an image section 2. FIG. 16B, meanwhile, illustrates part of a ceramic green sheet 4 serving as a printing target material, and illustrates the vicinity of a contour 6 of a conductive paste film 5 transferred from the gravure cylinder 1. Note that the image section 2 illustrated here is designed so that the outer edge 3 thereof forms a straight line.

As shown in FIG. 16A, the banks 7, as well as a plurality of recess-shaped cells 8 and 9 defined by the banks 7, are provided in the image section 2 of the gravure cylinder 1. The cells 8 and 9 are divided into edge cells 8 located along the outer edge of the image section 2, and center cells 9 that are the remaining cells. The cells 8 and 9 are filled with a conductive paste, and the conductive paste in the cells 8 and 9 is transferred to the ceramic green sheet 4 during printing. The conductive paste film 5 is formed on the ceramic green sheet 4, as shown in FIG. 16B, as a result.

However, the contour 6 of the transferred conductive paste film 5 does not follow a straight line as designed, as can be seen in FIG. 16B. More specifically, the contour 6 has a substantially wave shape that matches the distribution of the edge cells 8. With the recent trend toward miniaturization and increased precision of laminated ceramic electronic components, it is extremely desirable to improve the linearity of the contour 6 of the conductive paste film 5.

The techniques disclosed in Japanese Unexamined Patent Application Publication No. 6-316174 and Japanese Unexamined Patent Application Publication No. 2006-51721, for example, have garnered attention as techniques that can meet the aforementioned demands to a certain extent.

FIGS. 17A and 17B are diagrams, corresponding to FIGS. 16A and 16B, respectively, that illustrate a gravure cylinder 1a and a conductive paste film 5a configured using the same basic concept as the technique disclosed in Japanese Unexamined Patent Application Publication No. 6-316174. In FIGS. 17A and 17B, elements that correspond to the elements shown in FIGS. 16A and 16B are given the same reference numerals, and redundant descriptions thereof will be omitted.

As shown in FIG. 17A, the banks 7 that define the plurality of cells 8 and 9 are prevented from reaching the outer edge 3 of an image section 2a, and a predetermined interval 10 is provided between the outer edge 3 and the banks 7 that face the outer edge 3. As a result, substantially frame-shaped recess portions 11 that extend continuously along the outer edge 3 are provided in the image section 2a.

According to the gravure cylinder 1a that includes such an image section 2a, the contour 6 of the conductive paste film 5a will follow the outer edge 3 of the image section 2a in a precise manner, as shown in FIG. 17B, and as a result, the linearity of the contour 6 of the conductive paste film 5a is improved.

Nevertheless, the technique disclosed in Japanese Unexamined Patent Application Publication No. 6-316174 has the following problems to be solved.

Generally, when forming an image section on the outer circumferential surface of a gravure cylinder, a cylindrical base member configured of a metal is prepared, a plating layer is formed on the outer circumferential surface of the base member, and the image section, in which banks and cells are provided, is formed by partially removing the outer surface of the plating layer through chemical etching, for example.

With respect to the behavior of the etchant used in the chemical etching, it is easy for the etchant to accumulate in the predetermined interval 10 between the outer edge 3 and the banks 7 that face the outer edge 3 in the image section 2a shown in FIG. 17A; this makes it difficult for the etching to progress. Conversely, the etchant flows easily in areas comparatively far from the banks 7, such as in center areas of the edge cells 8, which makes it easy for the etching to progress.

As a result, arch portions 12 that curve outward are formed in the outer edge 3 of the image section 2a, in areas where the edge cells 8 are located, and as a result, the outer edge 3 takes on a shape in which comparatively large, continuous waves are present, as shown in FIG. 17A. For this reason, the contour 6 of the conductive paste film 5a formed on the ceramic green sheet 4 will also take on a shape in which comparatively large, continuous waves are present, as shown in FIG. 17B. While the linearity of the contour 6 of the conductive paste film 5a shown in FIG. 17B is better than the contour 6 of the conductive paste film 5a shown in FIG. 16B, it is necessary to reduce such waves to the greatest extent possible in the case where a higher degree of linearity is required.

Returning to the behavior of the etchant during chemical etching as mentioned earlier, it is known that widening the predetermined interval 10 in order to improve the flow of the etchant in the corresponding areas is effective as a way to improve the linearity of the outer edge 3 of the image section 2a. However, widening the predetermined interval 10 and by extension increasing the widths of the substantially frame-shaped recess portions 11 results in a problem that the required thickness cannot be obtained near the contour 6 of the conductive paste film 5a. This is because the transfer of the conductive paste starts from tips of the banks 7 that face the outer edge 3, and thus the amount of paste that is transferred drops due to the widening of the regions where the banks 7 are not present.

Meanwhile, FIG. 18 illustrates a gravure cylinder 1b configured using the same basic concept as the technique disclosed in Japanese Unexamined Patent Application Publication No. 2006-51721. FIG. 18 is a diagram corresponding to FIG. 16A or FIG. 17A. In FIG. 18, elements that correspond to the elements shown in FIG. 16A or FIG. 17A are given the same reference numerals, and redundant descriptions thereof will be omitted.

In an image section 2b of the gravure cylinder 1b shown in FIG. 18, the pitch at which the banks 7 extending toward the outer edge 3 are disposed is reduced, and the area of each of the edge cells 8 is reduced as a result. According to this gravure cylinder 1b, the degree of curvature in the arch portions 12 at the outer edge 3 of the image section 2b can be reduced by an amount corresponding to the reduction in pitch between the banks 7. Although not illustrated in the drawings, the degree of non-linearity in the contour of the transferred conductive paste film can be reduced as a result.

However, according to the gravure cylinder 1b described above, the edge cells 8 can be filled with a smaller amount of conductive paste. It is furthermore easier for the conductive paste to remain in the edge cells 8 during transfer due to the area of the opening of the edge cells 8 having dropped relative to the depth of the cells. Accordingly, like the gravure cylinder 1a shown in FIG. 17A, there is a problem that the required thickness cannot be obtained near the contour of the conductive paste film.

If the required thickness cannot be ensured near the contour of the conductive paste film, a further problem will appear in later steps in the manufacture of the laminated ceramic electronic component, such as firing, where metal particles present near the contour of the conductive paste film will be burned away and the surface area of the internal electrode will be reduced as a result. In a laminated ceramic capacitor, for example, this will lead to a problem in that the desired electrostatic capacity cannot be obtained.

SUMMARY

Accordingly, it is an object of the present disclosure to provide a gravure printing plate, and a manufacturing method thereof, capable of printing a paste film that has both a desired contour shape and a required film thickness.

It is another object of the present disclosure to provide a gravure printing machine that includes the aforementioned gravure printing plate.

It is yet another object of the present disclosure to provide a manufacturing method for a laminated ceramic electronic component that is executed using the aforementioned gravure printing machine.

The present disclosure is directed at a gravure printing plate used for transferring a paste film onto a printing target material through gravure printing. The gravure printing plate includes an image section to which a printing paste for forming the paste film is supplied, and the image section is provided with banks and a plurality of recess-shaped cells defined by the banks. This gravure printing plate has a configuration such as that described hereinafter in order to solve the aforementioned technical problems.

According to the present disclosure, each cell is provided with a projecting portion that projects from a part of a bottom surface of the cell, each projecting portion being distant from the banks and being provided in such a location that a distance from the projecting portion to an outer edge of the image section is shorter than a distance from the projecting portion to the nearest bank.

The aforementioned projecting portions do not reduce the volume of the cells as much as the banks, but it cannot be denied that the projecting portions have a negative effect of reducing the amount of printing paste with which the cells can be filled. However, the projecting portions distanced from the banks serve as a starting point for the transfer, in the same manner as the banks. Accordingly, there is a higher number of transfer starting points than in the case where the projecting portions are not provided. Accordingly, printing paste that would, in the case where the projecting portions are not provided, remain in the bases of the cells is transferred to the printing target material via the projecting portions, which increases the transfer efficiency.

Although the projecting portions and the banks may both be positioned in the image section so as to make contact with the outer edge, according to an aspect of the present disclosure, it is preferable that the projecting portions are located with a first predetermined interval from the outer edge of the image section, and the banks that face the outer edge are located with a second predetermined interval from the outer edge of the image section, and substantially frame-shaped recess portions that extend continuously along the outer edge are defined by the projecting portions, the banks and the first and second intervals. When the substantially frame-shaped recess portions are provided in this manner, the outer edge of the image section is defined by the substantially frame-shaped recess portions, which makes it possible to further suppress wave shapes from being formed in the contour of the printing paste film.

In the above aspects of the present disclosure, it is preferable that the first predetermined interval between the projecting portion and the outer edge and the second predetermined interval between the banks and the outer edge are substantially the same or have a difference of no greater than approximately 20%, a shape of a leading end of each projecting portion that faces the outer edge and a shape of a leading end of each bank that faces the outer edge are substantially the same shape, and furthermore, a depth of the substantially frame-shaped recess portions is shallower than a depth of center areas of the cells.

In the case where two banks that oppose each other with the projecting portion located therebetween are taken as a first bank and a second bank, respectively, it is preferable that an interval between the projecting portion and the first bank and an interval between the projecting portion and the second bank are substantially the same or have a difference of no greater than approximately 20%.

In a manufacturing method for a gravure printing plate that will be mentioned later, these aspects of the present disclosure realize, when chemical etching is employed to form the banks, the cells, and the projecting portions, a configuration in which the etching progresses in a more uniform manner along the outer edge of the image section. Accordingly, an improvement in the linearity of the outer edge of the image section, and by extension an improvement in the linearity of the contour of the paste film, can be made more certain.

It is preferable that at least two arch portions that curve outward are formed in a portion of the outer edge located between leading ends of adjacent banks. The configuration is easily realized when manufacturing the gravure printing plate by employing chemical etching as described above.

It is preferable that a height of the projecting portions is lower than a height of the banks.

It is preferable that there are provided two or more projecting portions in each cell.

It is preferable that the cells have substantially polygonal shapes.

According to an aspect of the present disclosure, it is preferable that the gravure printing plate is a substantially cylindrical-shaped gravure cylinder and the image section is formed on an outer circumferential surface thereof.

The present disclosure is also directed at a gravure printing machine including the aforementioned gravure printing plate.

Furthermore, the present disclosure is also directed at a manufacturing method for a laminated ceramic electronic component that is executed using the aforementioned gravure printing machine. In the manufacturing method for a laminated ceramic electronic component according to the present disclosure, the method uses a conductive paste as the printing paste and uses the aforementioned gravure printing machine to carry out the steps of forming, as the paste film, a conductive paste film that is to serve as an internal electrode, on the ceramic green sheet that serves as a printing target material, and creating a multilayer body by stacking a plurality of the ceramic green sheets on which the conductive paste film has been formed.

Further still, the present disclosure is also directed at a method for manufacturing the aforementioned gravure printing plate. A manufacturing method for the gravure printing plate according to the present disclosure includes the steps of preparing a base member configured of a metal, forming a plating layer on the base member, and forming the image section, in which the banks and the plurality of cells with the projecting portions formed therein are provided, by partially removing an outer surface of the plating layer.

In the manufacturing method for the gravure printing plate according to an aspect of the present disclosure, it is preferable that the step of forming the image section includes a step of partially removing the outer surface of the plating layer through chemical etching.

According to the gravure printing plate of the present disclosure as described above, the projecting portions are provided in the cells so as to be distanced from the banks and so as to be closer to the outer edge of the image section than the center of the cells, and thus the degree of non-planarities in the contour of the printed paste film can be reduced.

Meanwhile, the projecting portions serve as starting points for the transfer of the printing paste. Accordingly, the transfer efficiency can be improved and the required film thickness can be achieved in the paste film, as compared to a case where the projecting portions are not provided.

Other features, elements, characteristics and advantages of the present disclosure will become more apparent from the following detailed description of preferred embodiments of the present disclosure with reference to the attached drawings.

BRIEF DESCRIPTION OF THE DRAWINGS

FIG. 16A is a diagram, corresponding to FIG. 5, illustrating part of an image section in a gravure cylinder serving as a conventional gravure printing plate, in an enlarged manner, whereas

6-316174, in an enlarged manner, whereas

DETAILED DESCRIPTION

Figure 1:
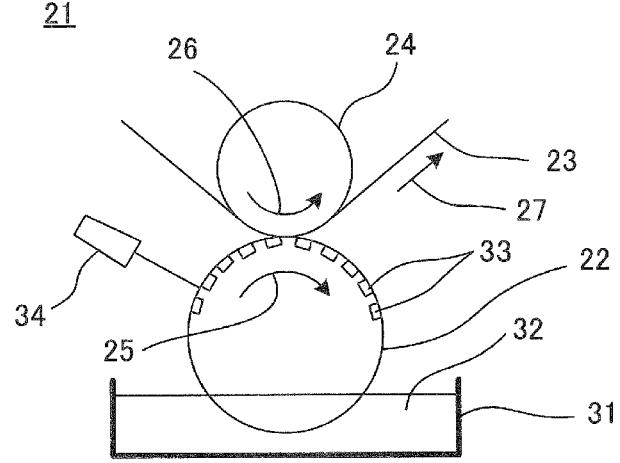
FIG. 1 is a forward view schematically illustrating a gravure printing machine including a gravure cylinder serving as a gravure printing plate according to the present disclosure.

An overview of a gravure printing machine 21 including a gravure cylinder 22 that serves as a gravure printing plate according to the present disclosure will be described with reference to FIG. 1.

The gravure printing machine 21 includes the gravure cylinder 22 and an impression cylinder 24 that opposes the gravure cylinder 22 with a substantially sheet-shaped printing target material 23 provided therebetween. The gravure cylinder 22 and the impression cylinder 24 rotate in the directions indicated by arrows 25 and 26, respectively, and the printing target material 23 is transported in the direction indicated by an arrow 27 as a result. Note that a gravure printing machine that does not include an impression cylinder, such as a gravure planographic printing machine, is also possible.

The gravure printing machine 21 is used for the manufacture of laminated ceramic electronic components such as laminated ceramic capacitors, for example. More specifically, the gravure printing machine 21 is used to form a paste film, which is to serve as a layer that is patterned as part of a layered structure provided in the laminated ceramic electronic component, on the printing target material 23 through gravure printing. Even more specifically, a conductive paste film 29 to serve as a patterned internal electrode is formed on a ceramic green sheet 28 through gravure printing, as shown in FIG. 2.

Figure 2:
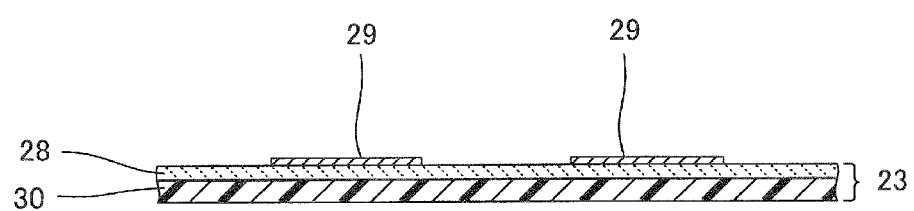
FIG. 2 is a cross-sectional view illustrating a state in which a conductive paste film is formed, by the gravure printing machine shown in FIG. 1, on a ceramic green sheet backed by a carrier film, serving as a printing target material.

The ceramic green sheet 28 is backed by a carrier film 30, as shown in FIG. 2. Accordingly, the printing target material 23 shown in FIG. 1 is the ceramic green sheet 28 that is backed by the carrier film 30 in this manner.

The gravure cylinder 22 is, as shown in FIG. 1, immersed in a conductive paste 32 held in a tank 31, and as a result applies the conductive paste 32 to a plurality of image sections 33 (only some of which are schematically shown) formed on the circumferential surface of the gravure cylinder 22. Details of the image sections 33 will be given later. Note that the conductive paste 32 may be supplied to the gravure cylinder 22 through a method such as ejecting the conductive paste 32 toward the gravure cylinder 22. Extra conductive paste 32 on the circumferential surface of the gravure cylinder 22 is wiped off by a doctor blade 34.

Figure 3:
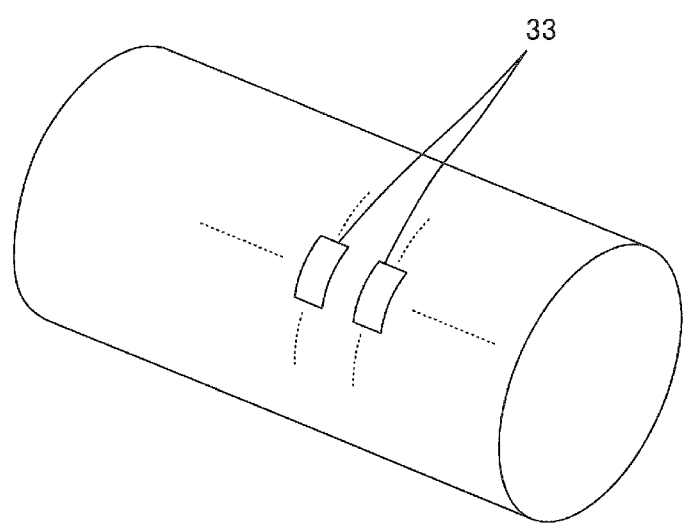
FIG. 3 is a perspective view illustrating the gravure cylinder shown in FIG. 1 alone.

The image sections 33, as schematically illustrated in FIG. 3 where only a representative example of the image sections 33 is shown, have a pattern corresponding to the pattern of the conductive paste film 29 shown in FIG. 2. In this embodiment, a lengthwise direction of the image sections 33 follows a circumferential direction of the gravure cylinder 22.

Figure 4:
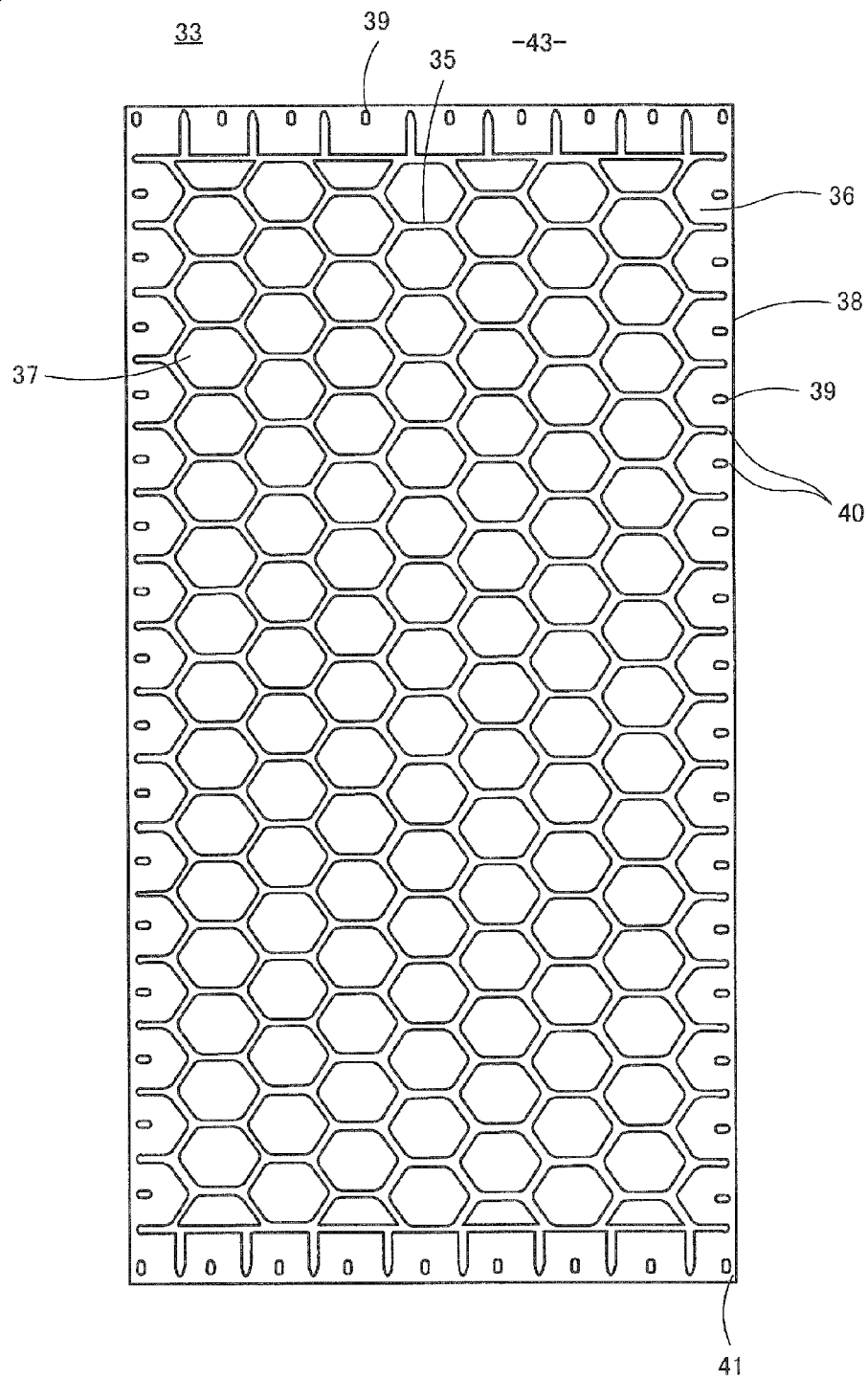
FIG. 4 is a view for explaining the gravure cylinder serving as a gravure printing plate according to a first embodiment of the present disclosure, and is an expanded view of an outer circumferential surface of the gravure cylinder showing an enlargement of a single image section shown in FIG. 3.

FIG. 4 is an expanded view of the circumferential surface of the gravure cylinder 22, illustrating a single image section 33 in an enlarged manner.

Banks 35, as well as a plurality of recess-shaped cells 36 and 37 defined by the banks 35, are provided in the image section 33. Some of the banks 35 have shapes extending in one direction, and the cells 36 and 37 are defined by a plurality of the banks 35 that extend in different directions. The plurality of banks 35 that extend in different directions and define the cells 36 and 37 are connected to each other. Preferably, the mesh size of the cells 36 and 37 is no less than approximately #150 (150 µm), and the depths thereof are no greater than approximately 30 µm.

The cells 36 and 37 are divided into edge cells 36 located along an outer edge 38 of the image section 33, and center cells 37 that are the remaining cells. The edge cells 36 and the center cells 37 have substantially polygonal shapes. Specifically, the center cells 37 are substantially hexagonal, whereas the edge cells 36 have approximately half-hexagonal shapes. Note that there are cases where the center cells 37 are not present and all of the cells are edge cells 36, such as the case where the image section 33 has a small area.

A projecting portion 39 is provided in each of the edge cells 36 so as to protrude from a part of the base surface of that edge cell 36. Each projecting portion 39 is provided in a position that is distanced from the banks 35, and that is closer to the outer edge 38 than to the nearest bank 35. The projecting portions 39 are arranged along the outer edge 38 and are disposed at regular intervals. Although a projecting portion 39 is provided for every edge cell 36 in FIG. 4, it should be noted that there may be some edge cells 36 that are not provided with the projecting portions 39, to the extent that the functionality of the projecting portions 39 is not lost.

The gravure cylinder 22 provided with the image sections 33 in this manner is manufactured as described hereinafter, for example.

1. A substantially drum-shaped cylinder (gravure cylinder) made of a metal such as a copper tube, an aluminum alloy tube, or the like is prepared.

2. The outer circumferential surface of the cylinder is plated with copper at a thickness of approximately 80 to 100 µm.

3. Part of the outer surface of the copper plating layer on the cylinder is removed in order to form the image sections 33. As a result, the plurality of recess-shaped cells 36 and 37 are formed so as to be defined by the banks 35, and the projecting portions 39 are formed in the edge cells 36. Here, a chemical etching technique, for example, can be employed to form the image sections 33. Note, however, that an electronic engraving technique performed by an etching device that uses diamond or a laser may be employed instead of a chemical etching technique.

4. After the image sections 33 have been formed, the surfaces thereof are covered by and reinforced with a thin chrome plating layer.

Next, the configuration of the image section 33 will be described in detail with reference to FIGS. 5 and 6, in addition to FIG. 4.

In this embodiment, the projecting portions 39 and the banks 35 that face the outer edge 38 are positioned at a predetermined interval 40 from the outer edge 38, and substantially frame-shaped recess portions 41 that extend continuously along the outer edge 38 are provided in the image section 33. The dimension of the interval 40, or in other words, the width of each substantially frame-shaped recess portion 41, is preferably set to approximately 10 to 30 µm. The presence of the substantially frame-shaped recess portions 41 contributes to an improvement in the linearity of the outer edge 38 of the image section 33, which as a result increases the linearity of a contour 42 of the conductive paste film 29 that is printed, as will be described later with reference to FIG. 8.

In the case where this advantage is not particularly desired, either the projecting portions 39, the banks 35 that face the outer edge 38, or both may make contact with the outer edge 38.

Figure 5:
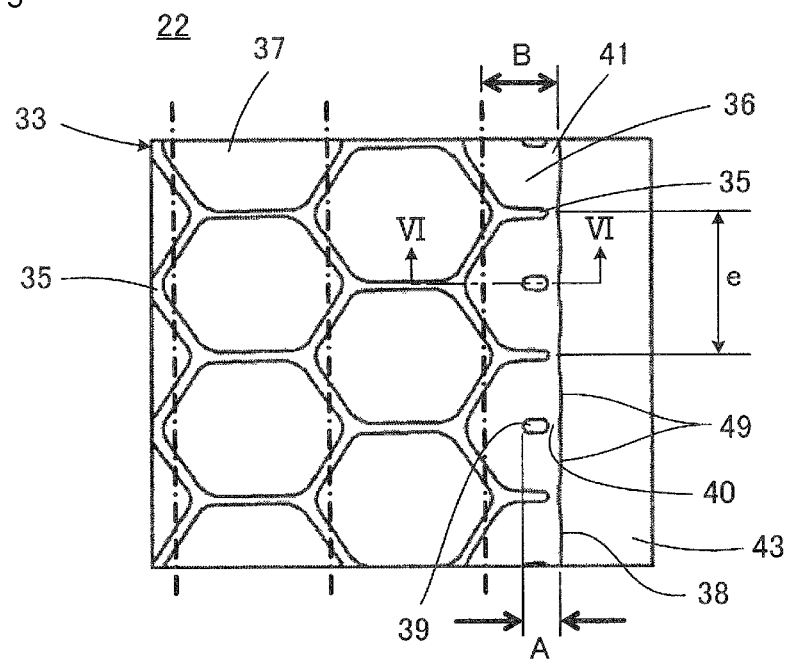
FIG. 5 is a diagram illustrating part of the image section 33 shown in FIG. 4 in a further enlarged manner.

As shown in FIGS. 4 and 5, the banks 35 that face the outer edge 38 and the outer edge 38 are orthogonal to each other. It is preferable for the plurality of banks 35 that face the outer edge 38 to be disposed at a uniform pitch along the outer edge 38. The edge cells 36 are linearly symmetrical relative to an axis of symmetry that follows a direction orthogonal to the outer edge 38. The center cells 37 are also linearly symmetrical relative to an axis of symmetry that follows a direction orthogonal to the outer edge 38.

Each projecting portion 39 is also linearly symmetrical, relative to the stated axis of symmetry for the edge cell 36 in which that projecting portion 39 is located. Accordingly, when two banks 35 that oppose each other with the projecting portion 39 located therebetween are taken as a first bank and a second bank, it is preferable for an interval between the projecting portion 39 and the first bank to be substantially equal to an interval between the projecting portion 39 and the second bank, or, allowing for a certain amount of error, for a difference therebetween to be within approximately 20%.

Furthermore, it is preferable for an interval between the projecting portions 39 and the outer edge 38 and an interval between the banks 35 and the outer edge 38 to be substantially equal or, allowing for a certain amount of error, for a difference therebetween to be within approximately 20%.

Although the number of projecting portions 39 is not particularly limited, it is desirable for approximately one to three projecting portions to be in each edge cell 36. An embodiment in which there are two projecting portions 39 will be described in detail later with reference to the drawings. Meanwhile, it is desirable for the total surface area of the projecting portion 39 to be no greater than approximately 5% of the area of the opening of the corresponding edge cell 36. This is because if the total surface area of the projecting portion 39 is too great, the area of the opening of the edge cell 36 will drop, and the thickness of the obtained conductive paste film 29 will drop near the contour 42.

It is preferable, from the standpoint of the ease of design, for the shape of leading ends of the projecting portions 39 facing the outer edge 38 to be substantially the same as the shape of leading ends of the banks 35 facing the outer edge 38. However, the shape of the leading ends of the projecting portions 39 may be different from the shape of the leading ends of the banks 35. Even in this case, it is preferable that the aforementioned area conditions be met.

Experiments that will be described later demonstrated that it is desirable for a length dimension A from the outer edge 38 to an inner end of the projecting portions 39 to be approximately one quarter to three quarters of a distance B from the outer edge 38 to the first cell pitch line parallel to the outer edge 38, as shown in FIG. 5. Setting the length dimension A to be no less than approximately one quarter of the distance B makes it possible to improve the efficiency of transfer by the projecting portions 39 during etching, whereas setting the length dimension A to be no more than approximately three quarters of the distance B makes it possible to suppress the thickness of the obtained conductive paste film 29 from dropping near the contour 42 due to the area of the openings of the edge cells 36 being excessively reduced.

Figure 6:
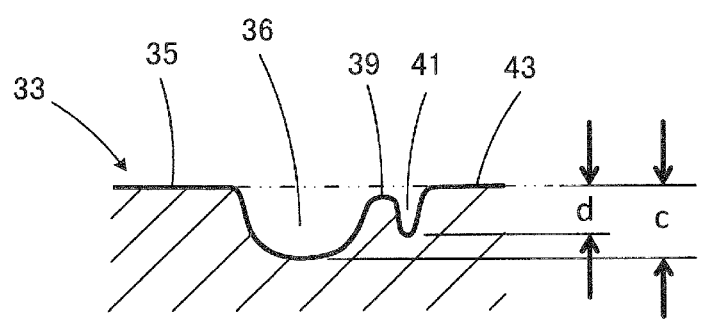
FIG. 6 is a cross-sectional view taken along a VI-VI line shown in FIG. 5.

As shown in FIG. 6, upper surfaces of the projecting portions 39 have substantially the same height as upper surfaces of the banks 35 and an outer circumferential surface 43 of the gravure cylinder 22, or may be lower than the outer circumferential surface 43 by approximately 5 μm, for example. As shown in FIG. 1, the gravure cylinder 22 is pressurized by the impression cylinder 24 with the printing target material provided therebetween during printing, and thus the projecting portions 39 can make contact with the printing target material 23 even if the projecting portions 39 are slightly lower. Making the upper surfaces of the projecting portions 39 lower than the outer circumferential surface 43 of the gravure cylinder 22 makes it possible to suppress the doctor blade 34 and the projecting portions 39 from damaging each other when the conductive paste 32 is wiped off by the doctor blade 34.

Meanwhile, it is preferable for a depth "d" of each substantially frame-shaped recess portion 41 to be shallower than a depth "c" in a center area of each edge cell 36, as shown in FIG. 6. Furthermore, it is preferable for the depth "d" of each substantially frame-shaped recess portion 41 to be approximately one third to three quarters of the depth "c" in the center area of each edge cell 36. Because chemical etching is employed in the manufacturing method, it is necessary to increase the widths of the substantially frame-shaped recess portions 41 in order to increase the depth "d" of the substantially frame-shaped recess portions 41, and as such, widening the interval 40 between the projecting portions and the outer edge 38 will reduce the effects of the projecting portions 39. It is thus preferable to suppress the depth "d" of the substantially frame-shaped recess portions 41 in order to keep the width of the substantially frame-shaped recess portions 41 at approximately 10 to 30 μm, for example.

Figure 7:
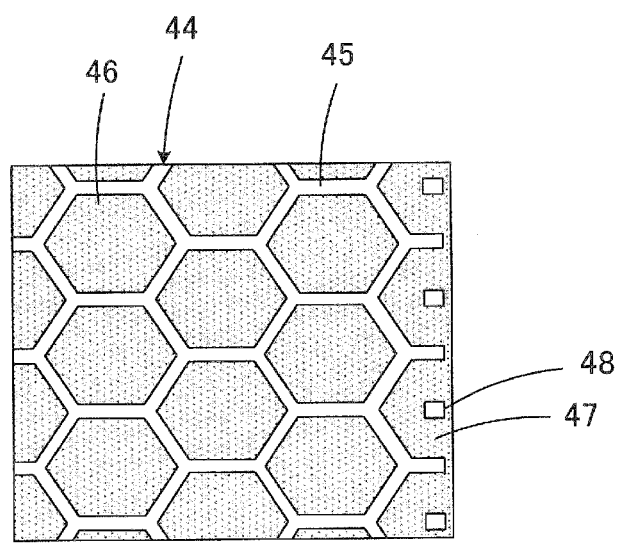
FIG. 7 is a pattern design diagram, corresponding to FIG. 5, illustrating an etching resist provided in order to obtain the image section shown in FIG. 5.

FIG. 7 is a pattern design diagram, corresponding to FIG. 5, illustrating an etching resist 44 provided in order to obtain the image section 33 shown in FIG. 5.

In FIG. 7, a portion 45 that corresponds to the banks 35 indicates a portion where the etching resist 44 is present, and is indicated as a blank area. An open portion 46 in the etching resist 44 that corresponds to the center cells 37 is substantially hexagonal in shape, whereas an open portion 47 that corresponds to the edge cells 36 has a substantially half-hexagonal shape. Meanwhile, the etching resist 44 is also present at portions 48, which correspond to the projecting portions 39 and are located within each open portion 47 that corresponds to the edge cell 36.

When chemical etching is carried out using the etching resist 44 as described earlier, the copper plate layer on the outer circumferential surface of the gravure cylinder 22 is bit not only in the thickness direction, but also in a main surface direction. As a result, the banks 35 and the projecting portions 39 are thinner and have more rounded corners than the corresponding portions 45 and 48 in the etching resist 44, as shown in FIG. 5.

Figure 16A:
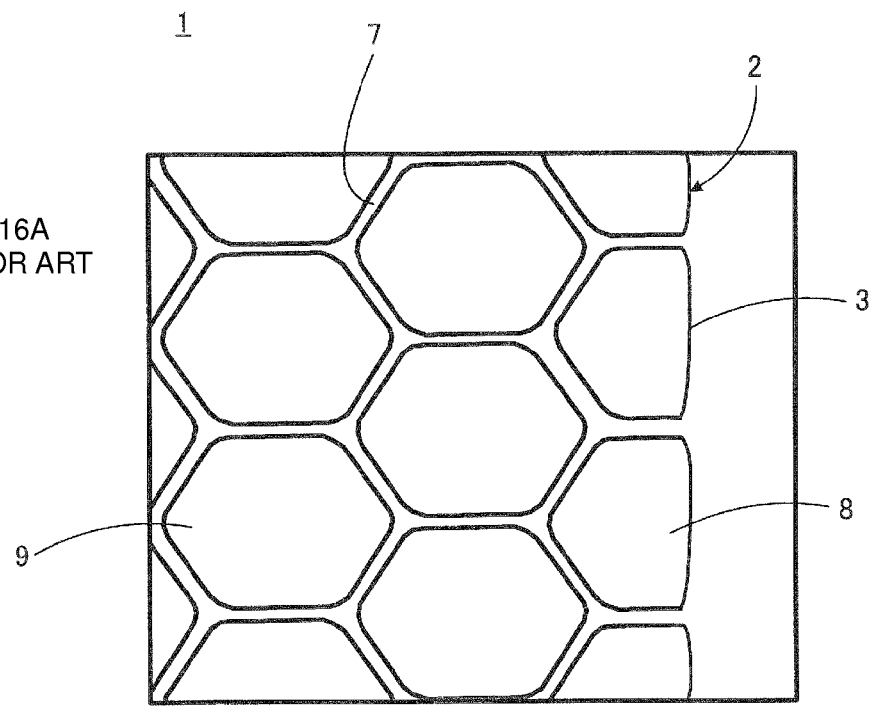
Figure 16B:
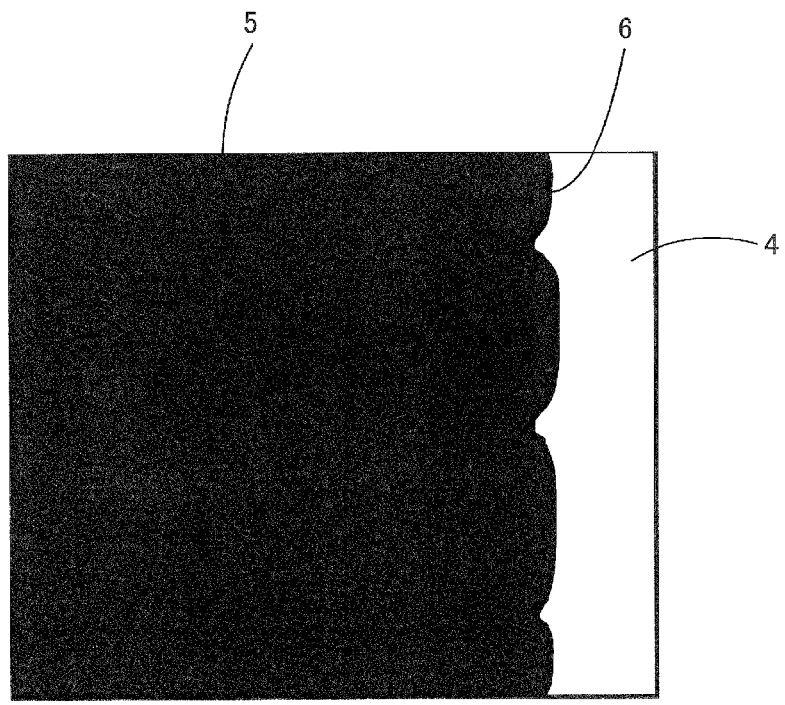
FIG. 16B is a diagram, corresponding to FIG. 8, illustrating a conductive paste film printed using the image section shown in FIG. 16A.
Figure 17A:
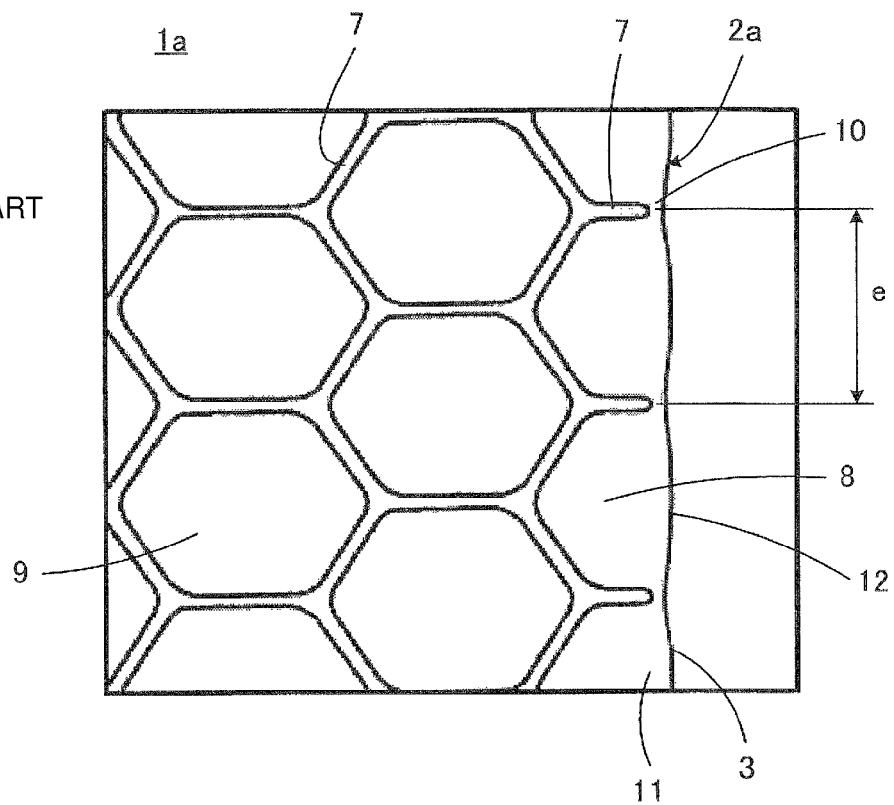
FIG. 17A is a diagram, corresponding to FIG. 5, illustrating part of an image section in a gravure cylinder configured using the same basic concept as the technique disclosed in Japanese Unexamined Patent Application Publication No.
Figure 17B:
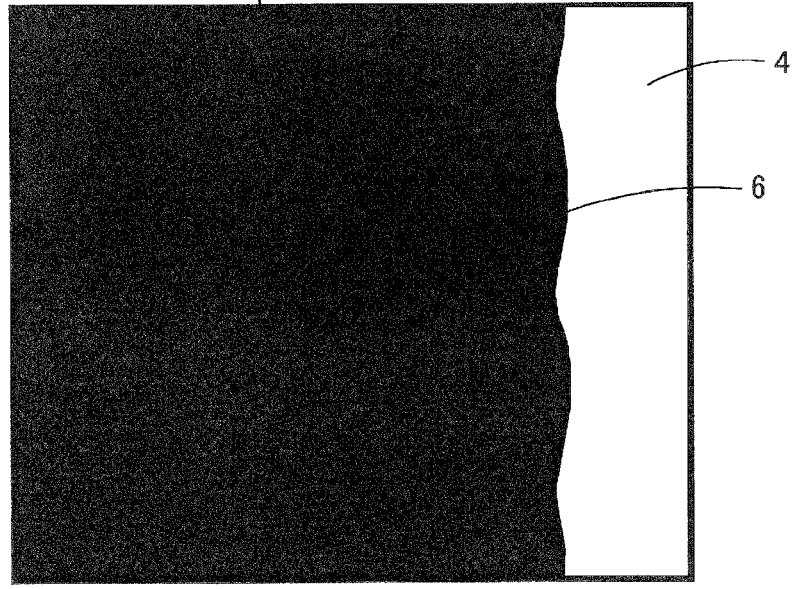
FIG. 17B is a diagram, corresponding to FIG. 8, illustrating a conductive paste film printed using the image section shown in FIG. 17A.
Figure 18:
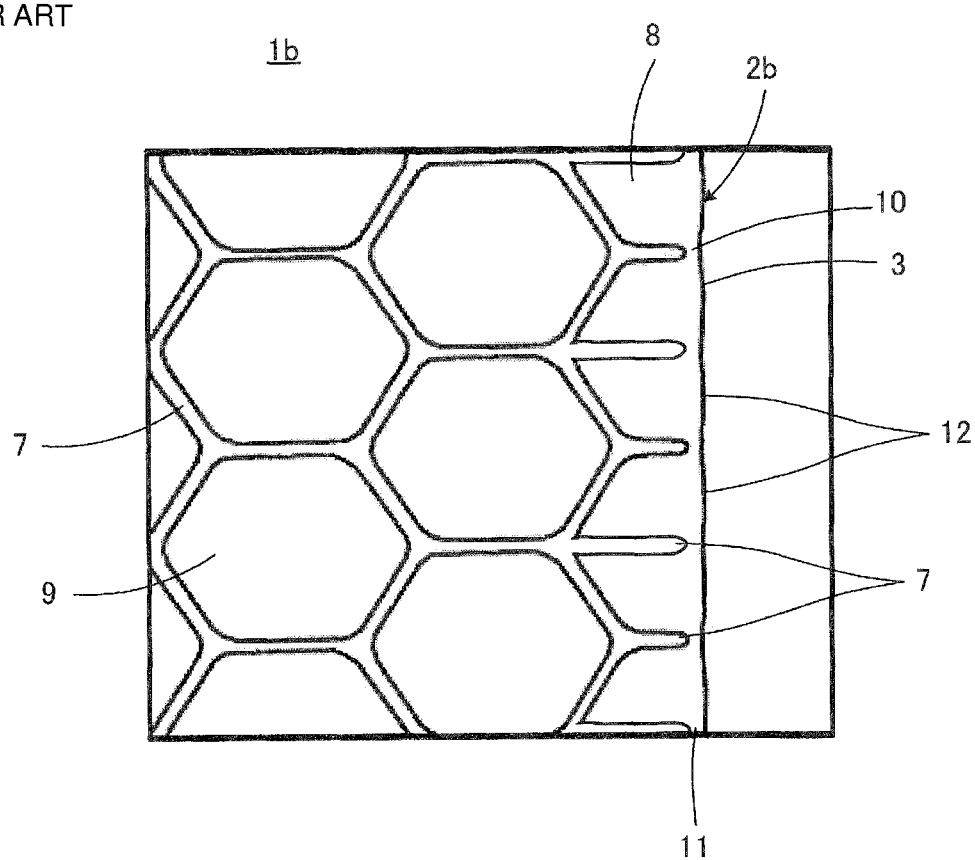
FIG. 18 is a diagram, corresponding to FIG. 5, illustrating part of an image section in a gravure cylinder configured using the same basic concept as the technique disclosed in Japanese Unexamined Patent Application Publication No. 2006-51721, in an enlarged manner.

Meanwhile, it is easy for etchant to accumulate in the vicinity of each bank 35 and projecting portion 39 at the outer edge 38 of the image section 33, which slows the progress of the etching; on the other hand, the etchant flows better further from the banks 35 and the projecting portions 39, which accelerates the progress of the etching. As a result, as shown in FIG. 5, at the outer edge 38 of the image section 33, a portion between the bank 35 and the projecting portion 39 is bit so as to curve slightly outward, forming two arch portions 49, which curve outward, in areas corresponding to locations in the outer edge 38 between leading ends of adjacent banks 35. The degree of curvature of these arch portions 49 can be reduced compared to that shown in FIG. 16A or FIG. 17A due to the presence of the projecting portions 39.

Figure 8:
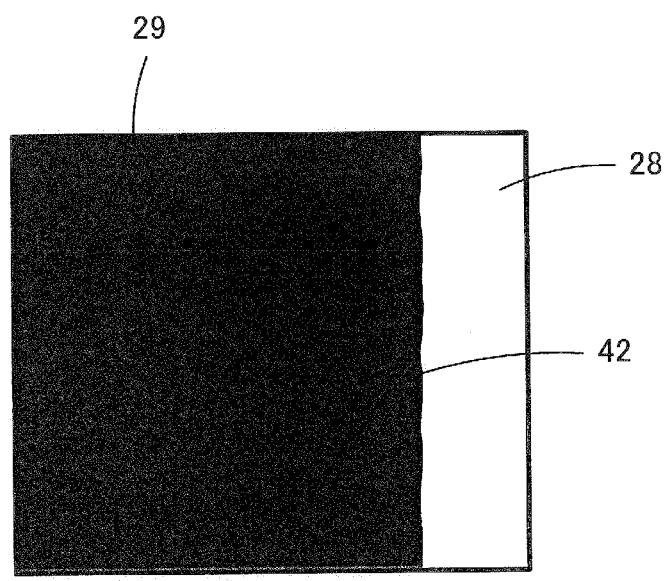
FIG. 8 is a plan view illustrating a conductive paste film printed using the image section shown in FIG. 5.

FIG. 8 is a plan view illustrating the conductive paste film 29 printed using the image section 33 shown in FIG. 5.

As shown in FIG. 8, favorable linearity is achieved in the contour 42 of the conductive paste film 29. Note that the contour 42 of the conductive paste film 29 typically has a shape in which the shape of the outer edge 38 of the image section 33 is exaggerated due to bleeding in the conductive paste, with the shape tracing the shape of the outer edge 38 of the image section 33.

From the foregoing descriptions, it can be seen that reducing the pitch of the banks at the outer edge of the image section, and furthermore providing the projecting portions in the cells, improves the linearity of the contour in the printed conductive paste film. The following experiments were carried out to confirm this phenomenon.

Figure 9:
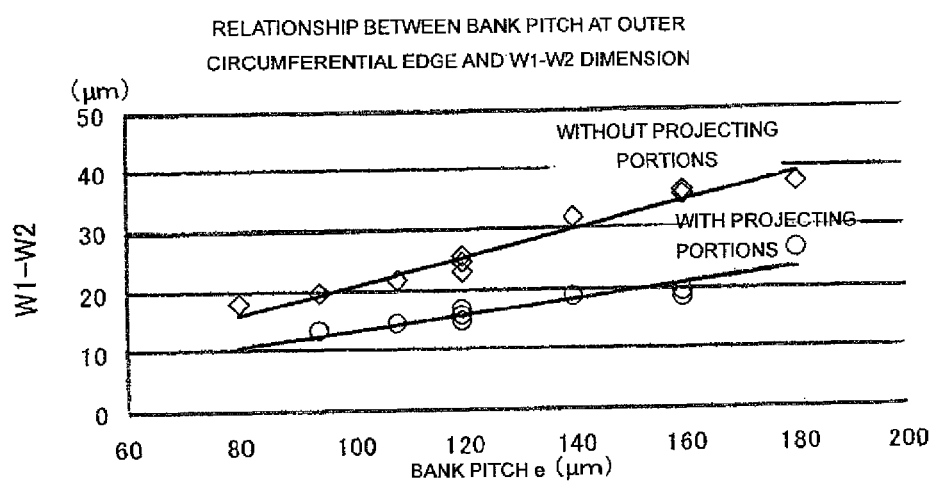
FIG. 9 is a graph illustrating a relationship between a bank pitch "e" at the outer edge of the image section and a W1-W2 dimension obtained through experimentation, and compares a case where no projecting portions are present with a case where projecting portions are present.
Figure 10:
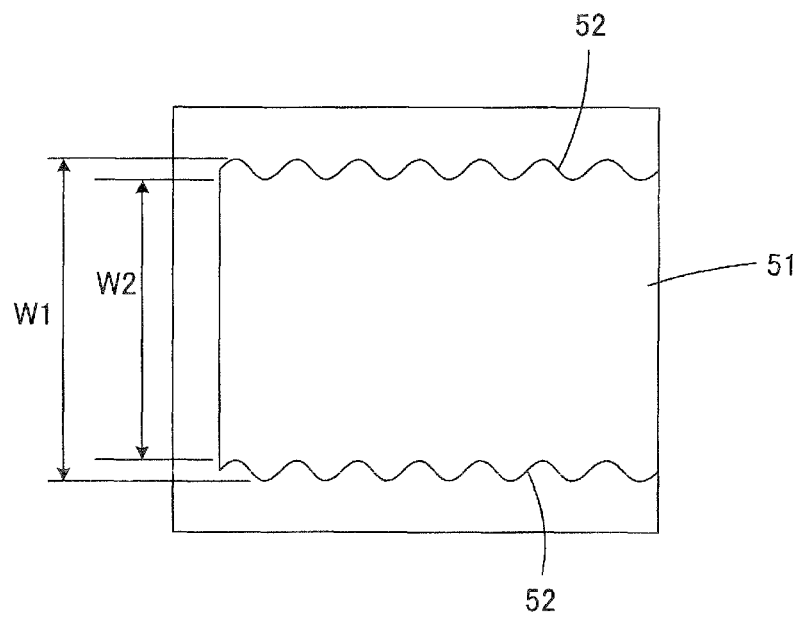
FIG. 10 is a plan view of a conductive paste film in order to explain the W1-W2 dimension represented by the vertical axis in FIG. 9.

FIG. 9 is a graph illustrating a relationship between a bank pitch "e" at the outer edge of the image section and a W1-W2 dimension obtained through this experimentation, and compares a case where no projecting portions are present with a case where projecting portions are present. Note that the W1-W2 dimension represented by the vertical axis in FIG. 9 is indicated in FIG. 10. FIG. 10 is a plan view illustrating part of a printed conductive paste film 51. In the case of measuring the dimension of the conductive paste film 51, when a value measured between outer side portions of the waves in a contour 52 of the conductive paste film 51 is expressed as W1 and a value measured in the same manner between inner side portions of the waves in the contour 52 is expressed as W2, the linearity improves as the value of W1-W2 decreases.

In the experiment, the relationship between the bank pitch "e" at the outer edge of the image section (see FIGS. 5 and 17A) and the stated W1-W2 dimension was researched. FIG. 9 illustrates the results thereof.

As shown in FIG. 9, it can be seen that the W1-W2 dimension is proportional to the bank pitch "e", and drops as the bank pitch "e" drops. To rephrase, it can be seen that the linearity of the contour 52 of the conductive paste film 51 improves as the bank pitch "e" drops. This holds true for both the case where the projecting portions are not provided and the case where the projecting portions are provided.

Next, the case where the projecting portion are not provided and the case where the projecting portion are provided will be compared.

In gravure printing using an intaglio, the conductive paste with which the cells 36 and 37 are filled is transferred onto the ceramic green sheet, which serves as the printing target material, via the banks 35 and the outer edge 38. However, the conductive paste in the cells 36 and 37 is not completely transferred, and some of the conductive paste will remain in the bases of the cells 36 and 37.

By providing the projecting portions 39 in the edge cells 36, the edge cells 36 can be filled with a slightly lower amount of the conductive paste than in the case where the projecting portions 39 are not provided. However, this also increases the number of locations that can serve as starting points for the transfer, and the conductive paste that would previously remain in the bases of the edge cells 36 without being transferred can now be transferred via the projecting portions 39, which increases the transfer efficiency.

Repeated experimentation demonstrated that there is a size range for the projecting portions 39 at which the reduction in cell volume and the improvement in the transfer efficiency caused by increasing the starting points for transfer cancel each other out.

This range corresponds to the size of the projecting portion 39 being no greater than approximately 5% of the area of the opening of the edge cell 36, and the length dimension A from the outer edge 38 to the inner end of the projecting portions 39 being approximately one quarter to three quarters of the distance B from the outer edge 38 to the first cell pitch line parallel to the outer edge 38. Within this range, the thickness of the conductive paste film 29 near the contour 42 was the same regardless of whether or not the projecting portions 39 were present.

The state of the conductive paste film 29 can be evaluated using a stylus-based surface roughness tester, a laser microscope, a three-dimensional surface shape measuring device, or the like.

"With projecting portions", shown in FIG. 9, is based on a sample in which the surface area of each projecting portion was approximately 2 to 3% of the area of the opening of the corresponding edge cell. By comparing "with projecting portions" to "without projecting portions" in FIG. 9, it can be seen that the W1-W2 dimension drops and the linearity of the contour of the conductive paste film improves. In other words, providing the projecting portions makes it possible to improve the linearity of the contour of the conductive paste film while maintaining the film thickness, without altering the bank pitch "e".

Although FIG. 9 illustrates the bank pitch "e" as only being within a range of approximately 80 to 180 μm, it should be noted that providing the projecting portion can provide the effect of improving the linearity of the contour of the conductive paste film while maintaining the film thickness, even if the bank pitch "e" is less than approximately 80 μm or greater than approximately 180 μm.

After obtaining the ceramic green sheet 28 on which a conductive paste 29 has been formed, as shown in FIG. 2, using a gravure printing machine 21 provided with the gravure cylinder 22 described thus far, a plurality of the ceramic green sheets 28 are stacked and pressure-bonded, cut as necessary, and then calcined, producing a layered structure to serve as a component main body for a laminated ceramic electronic component. The conductive paste film 29 configures an internal electrode in this layered structure, as mentioned earlier. Next, the laminated ceramic electronic component is completed by forming outer electrodes and the like on an outer surface of the layered structure.

In this laminated ceramic electronic component, the conductive paste film 29 has a highly-precise contour and the required thickness near the contour, as described earlier; as such, the internal electrode also has a highly-precise contour and the required thickness near the contour. Accordingly, desired characteristics can be achieved by the laminated ceramic electronic component that is obtained; for example, a desired electrostatic capacity can be achieved in the case of a laminated ceramic capacitor.

Several variations on the image section will be described hereinafter.

Figure 11:
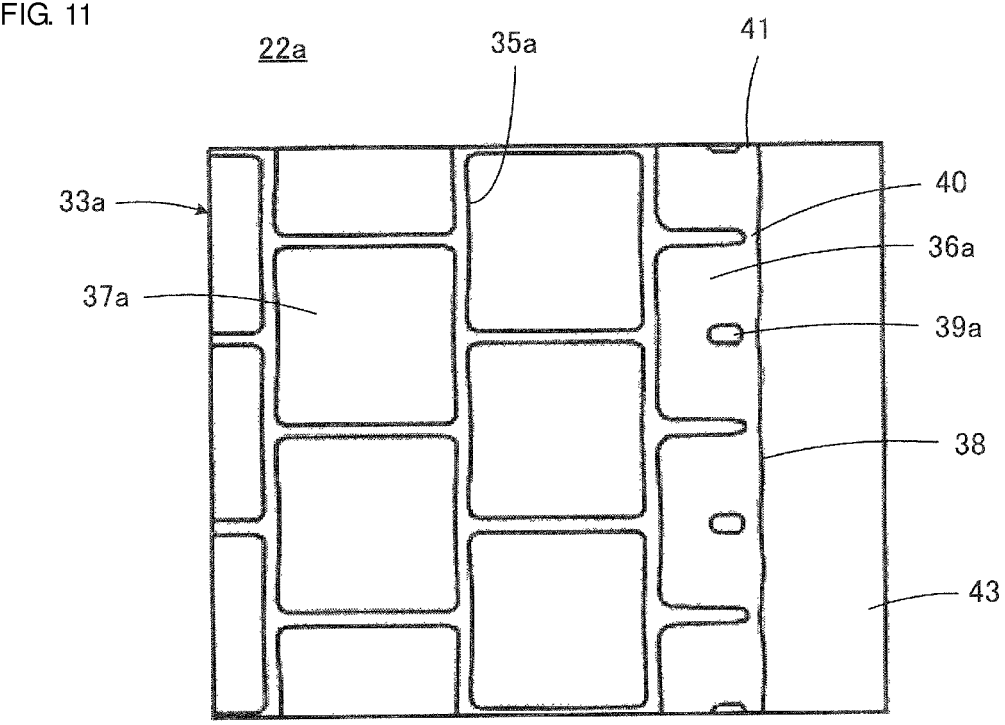
FIG. 11 is a diagram, corresponding to FIG. 5, that illustrates part of an image section provided in a gravure cylinder serving as a gravure printing plate according to a second embodiment of the present disclosure, in an enlarged manner.

FIG. 11 illustrates part of an image section 33a provided in a gravure cylinder 22a according to a second embodiment of the present disclosure in an enlarged manner. Banks 35a, as well as a plurality of cells 36a and 37a defined by the banks 35a, are provided in the image section 33a. FIG. 11, as well as FIGS. 12 to 15, which will be described later, are diagrams that correspond to FIG. 5. As such, the same reference signs, or reference signs containing common numbers, are given to the elements in FIGS. 11 to 15 that correspond to the elements shown in FIG. 5, and redundant descriptions thereof will be omitted.

In FIG. 11, the cells 36a and 37a are substantially quadrangular in shape. Projecting portions 39a are provided in the edge cells 36a. Different sizes, shapes, and so on for the cells are used depending on the printing paste that is used, the film thickness that is desired, and so on.

Figure 12:
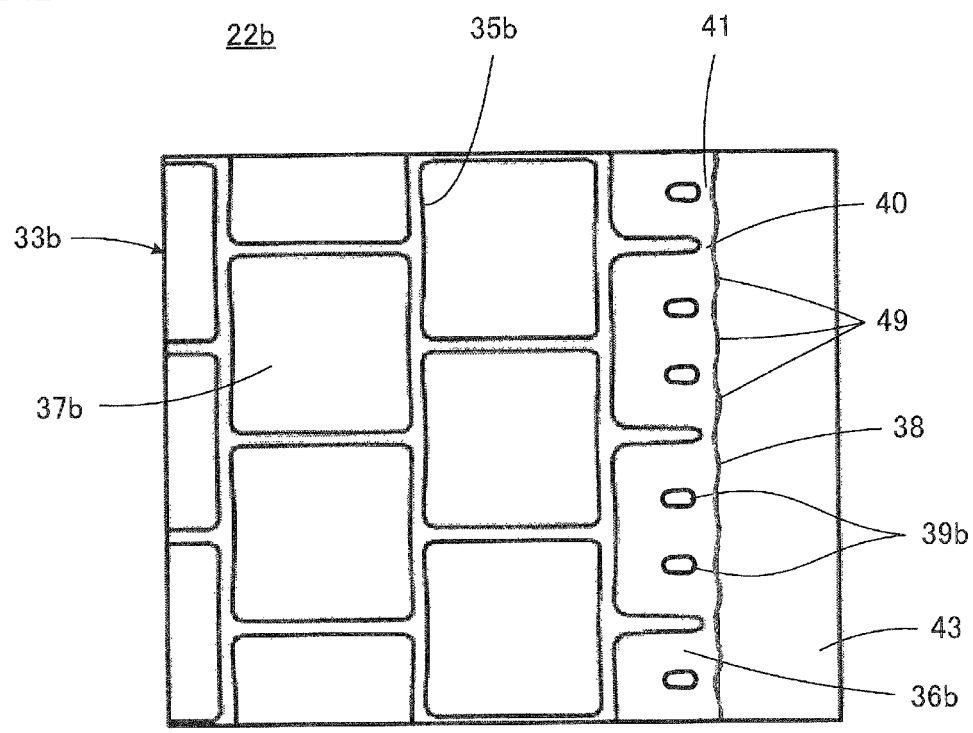
FIG. 12 is a diagram, corresponding to FIG. 5, that illustrates part of an image section provided in a gravure cylinder serving as a gravure printing plate according to a third embodiment of this disclosure, in an enlarged manner.

FIG. 12 illustrates part of an image section 33b provided in a gravure cylinder 22b according to a third embodiment of the present disclosure in an enlarged manner. Banks 35b, as well as a plurality of cells 36b and 37b defined by the banks 35b, are provided in the image section 33b.

As in FIG. 11, the cells 36b and 37b are substantially quadrangular in shape in FIG. 12; however, two projecting portions 39b are provided in each edge cell 36b. Employing such a configuration makes the transferability at the outer edge 38 more uniform, which in turn improves the linearity of the contour in the paste film 29. In particular, in the case where the image section 33b is formed through chemical etching when manufacturing the gravure cylinder 22b, the chemical etching progresses uniformly with more ease near the outer edge 38 of the image section 33b, which makes it possible to reduce the degree of outward curvature at the outer edge 38. Furthermore, in this embodiment, the elements are disposed along the outer edge 38 in the following order, namely the bank 35b, the projecting portion 39b, the projecting portion 39b, the bank 35b, the projecting portion 39b, the projecting portion 39b, and so on, and these elements are arranged at approximately the same pitch. In such a configuration, three arch portions 49 are formed between adjacent banks 35b.

Figure 13:
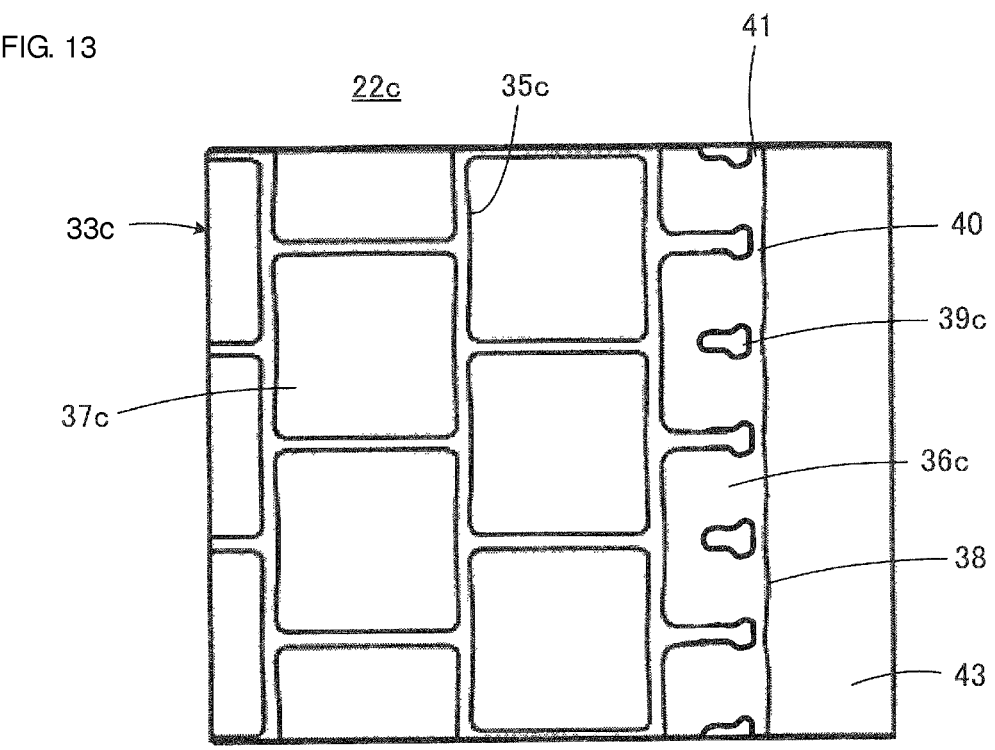
FIG. 13 is a diagram, corresponding to FIG. 5, that illustrates part of an image section provided in a gravure cylinder serving as a gravure printing plate according to a fourth embodiment of the present disclosure, in an enlarged manner.

FIG. 13 illustrates part of an image section 33c provided in a gravure cylinder 22c according to a fourth embodiment of the present disclosure in an enlarged manner. Banks 35c, as well as a plurality of cells 36c and 37c defined by the banks 35c, are provided in the image section 33c.

In FIG. 13, leading ends of the banks 35c that face the outer edge 38 are widened. Projecting portions 39c are also shaped in the same manner as the banks 35c, with leading ends of the projecting portions 39c that face the outer edge 38 being widened. Employing such a configuration makes the transferability at the outer edge 38 more uniform, which in turn improves the linearity of the contour in the paste film 29, in the same manner as described above with reference to FIG. 12. In particular, in the case where the image section 33c is formed through chemical etching when manufacturing the gravure cylinder 22c, the ease with which the chemical etching progresses becomes even more uniform near the outer edge 38 of the image section 33c, which makes it possible to reduce the degree of outward curvature at the outer edge 38.

Figure 14:
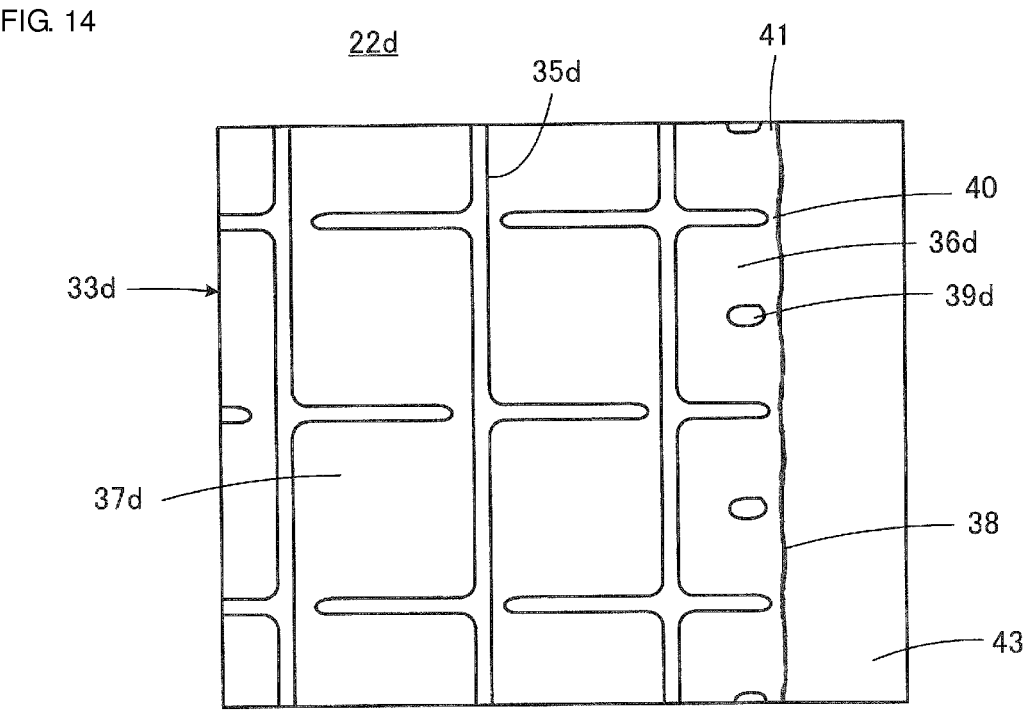
FIG. 14 is a diagram, corresponding to FIG. 5, that illustrates part of an image section provided in a gravure cylinder serving as a gravure printing plate according to a fifth embodiment of the present disclosure, in an enlarged manner.

FIG. 14 illustrates part of an image section 33d provided in a gravure cylinder 22d according to a fifth embodiment of the present disclosure in an enlarged manner. Banks 35d, as well as a plurality of cells 36d and 37d defined by the banks 35d, are provided in the image section 33d.

In FIG. 14, center cells 37d that are adjacent to each other partially communicate with each other. As such, even if the center cells 37d are not closed off from each other, the effect of providing the projecting portions 39d in the edge cells 36d can be achieved in the same manner as when the center cells are closed off.

Figure 15:
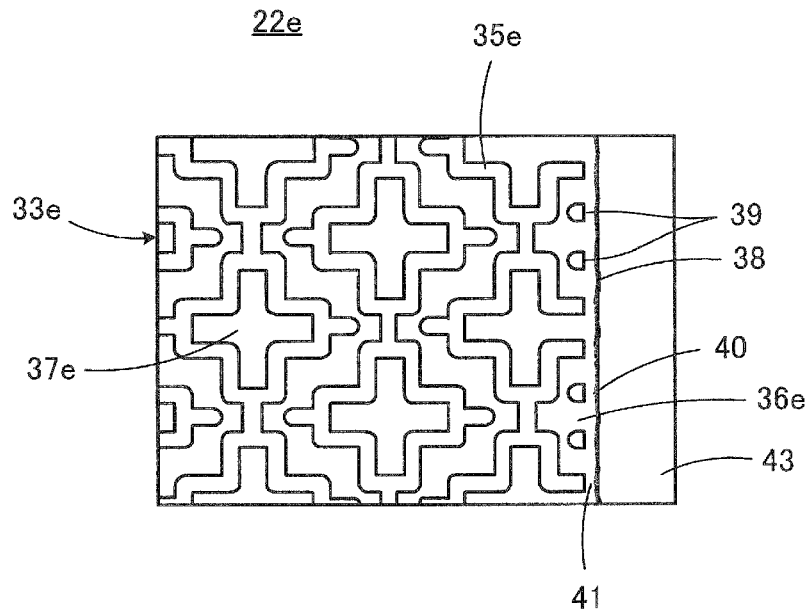
FIG. 15 is a diagram, corresponding to FIG. 5, that illustrates part of an image section provided in a gravure cylinder serving as a gravure printing plate according to a sixth embodiment of the present disclosure, in an enlarged manner.

FIG. 15 illustrates part of an image section 33e provided in a gravure cylinder 22e according to a sixth embodiment of the present disclosure in an enlarged manner. Banks 35e, as well as a plurality of cells 36e and 37e defined by the banks 35e, are provided in the image section 33e.

In FIG. 15, the banks 35e extend in a complex shape, and the cells 36e and 37e have special shapes in accordance therewith. Furthermore, there are two types of edge cells 36e, namely a type in which an opening that faces the outer edge 38 is wide and a type in which the stated opening is narrow; two projecting portions 39e are provided in the edge cells 36e that have wider openings. In this embodiment, the elements are disposed along the outer edge 38 in the following order, namely the bank 35e, the bank 35e, the projecting portion 39e, the projecting portion 39e, the bank 35e, the bank 35e, the projecting portion 39e, the projecting portion 39e, and so on, and these elements are arranged at approximately the same pitch.

While the present disclosure has been described thus far with reference to embodiments illustrated in the drawings, it should be noted that many variations can be made thereon without departing from the scope of the disclosure.

For example, although the image sections 33 and so on are illustrated and described in the embodiments as being substantially rectangular in shape, the shape of the image sections can be altered as desired in accordance with the pattern of the conductive paste film 29 to be formed through the gravure printing.

Furthermore, although the embodiments illustrate and describe the printing target material 23 as being the ceramic green sheet 28 backed by the carrier film 30, with the conductive paste film 29 being formed on the ceramic green sheet 28, a resin sheet such as the carrier film 30 may be used alone as the printing target material 23 and the conductive paste film 29 may be formed on that resin sheet, for example. In this case, the conductive paste film 29 formed on the resin sheet is transferred onto the ceramic green sheet 28 in a subsequent process.

Furthermore, although the embodiments illustrate and describe a paste film formed through gravure printing as the conductive paste film 29, the film may be configured of a paste-form entity such as a ceramic slurry, for example. More specifically, in laminated ceramic capacitors, for example, a ceramic layer for eliminating non-planarities with the thicknesses of internal electrodes is sometimes formed in regions where the internal electrodes are not formed in order to eliminate those non-planarities, and the present disclosure can also be applied in cases where a paste film, configured of a ceramic slurry, that is to serve as such a ceramic layer is formed.

Furthermore, although the embodiments illustrate and describe the projecting portions 39 being provided in the edge cells 36, for example, there may, depending on the pattern in the image section, be situations where there are no cells that correspond to center cells, or in other words, where there is no clear distinction between center cells and edge cells. Accordingly, the projecting portions may be provided in cells that cannot unequivocally be called "edge cells", as a concept relative to center cells.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A gravure printing plate used for transferring a paste film onto a printing target material through gravure printing, the plate comprising:
    an image section to which a printing paste for forming the paste film is supplied,
    wherein the image section is provided with banks and a plurality of substantially recess-shaped cells defined by the banks; and
    a plurality of the cells being provided with a projecting portion that projects from a part of a bottom surface of the cell, each projecting portion being distant from the banks and being provided in such a location that a distance from the projecting portion to an outer edge of the image section is shorter than a distance from the projecting portion to the nearest bank.

2. The gravure printing plate according to claim 1, where in the image section, the projecting portions are located with a first predetermined interval from the outer edge of the image section, and the banks that face the outer edge are located with a second predetermined interval from the outer edge of the image section, and substantially frame-shaped recess portions that extend continuously along the outer edge are defined by the projecting portions, the banks and the first and second intervals.

3. The gravure printing plate according to claim 2, wherein the first predetermined interval between the projecting portion and the outer edge and the second predetermined interval between the banks and the outer edge are substantially the same or have a difference of no greater than approximately 20%.

4. The gravure printing plate according to claim 2, wherein a shape of a leading end of each projecting portion that faces the outer edge and a shape of a leading end of each bank that faces the outer edge are substantially the same shape.

5. The gravure printing plate according to claim 2, wherein a depth of the substantially frame-shaped recess portions is shallower than a depth of center areas of the cells.

6. The gravure printing plate according to claim 1, wherein when two banks that oppose each other with the projecting portion located between the two banks are taken as a first bank and a second bank, respectively, an interval between the projecting portion and the first bank and an interval between the projecting portion and the second bank are substantially the same or have a difference of no greater than approximately 20%.

7. The gravure printing plate according to claim 1, wherein at least two arch portions that curve outward are formed in a portion of the outer edge located between leading ends of adjacent banks.

8. The gravure printing plate according to claim 1, wherein a height of the projecting portions is lower than a height of the banks.

9. The gravure printing plate according to claim 1, wherein two or more projecting portions are provided in each cell.

10. The gravure printing plate according to claim 1, wherein the cells have substantially polygonal shapes.

11. The gravure printing plate according to claim 1, wherein the plate is a substantially cylindrical-shaped gravure cylinder and the image section is formed on an outer circumferential surface of the gravure cylinder.

12. A gravure printing machine comprising the gravure printing plate according to claim 1.

13. A manufacturing method for a laminated ceramic electronic component, the method using a conductive paste as a printing paste and comprising the steps of:
    forming, as a paste film, the conductive paste film that is to serve as an internal electrode, on a ceramic green sheet that serves as a printing target portion while using the gravure printing machine according to claim 12; and
    creating a multilayer body by stacking a plurality of the ceramic green sheets on which the conductive paste film has been formed.

14. A method for manufacturing the gravure printing plate according to claim 1, the method comprising the steps of:
    preparing a base member configured of a metal;
    forming a plating layer on the base member; and
    forming the image section, in which the banks and the plurality of cells with the projecting portions formed therein are provided, by partially removing an outer surface of the plating layer.

15. The manufacturing method for the gravure printing plate according to claim 14, wherein the step of forming the image section includes a step of partially removing the outer surface of the plating layer through chemical etching.

* * * * *